US 8,266,809 B2

(12) United States Patent
Scheyer et al.

(10) Patent No.: US 8,266,809 B2
(45) Date of Patent: Sep. 18, 2012

(54) SPIRIT LEVEL

(75) Inventors: Wolfgang Scheyer, Goetzis (AT); Lukas Zwing, Dornbirn (AT)

(73) Assignee: Sola-Messwerkzeuge GmbH, Goetzis (AT)

( * ) Notice: Subject to any disclaimer, the term of this patent is extended or adjusted under 35 U.S.C. 154(b) by 0 days.

(21) Appl. No.: 12/947,093

(22) Filed: Nov. 16, 2010

(65) Prior Publication Data

US 2011/0113638 A1    May 19, 2011

(30) Foreign Application Priority Data

Nov. 16, 2009   (AT) .................................. 1802/2009

(51) Int. Cl.
*G01C 9/26* (2006.01)
(52) U.S. Cl. .......................................................... 33/379
(58) Field of Classification Search ............. 33/379–391
See application file for complete search history.

(56) References Cited

U.S. PATENT DOCUMENTS

| 2,514,500 | A | * | 7/1950 | Kroener | 33/378 |
| 2,833,054 | A | * | 5/1958 | Wheeler | 33/382 |
| 3,190,010 | A | * | 6/1965 | Johnson | 33/381 |
| 3,835,549 | A | | 9/1974 | De Jong et al. | |
| 5,992,033 | A | * | 11/1999 | Scarborough | 33/384 |
| 7,568,292 | B2 | * | 8/2009 | Maruyama | 33/385 |
| 2008/0086901 | A1 | | 4/2008 | Abrecht | |
| 2011/0265340 | A1 | * | 11/2011 | Kallabis | 33/381 |
| 2011/0271537 | A1 | * | 11/2011 | Scheyer et al. | 33/379 |

FOREIGN PATENT DOCUMENTS

| AT | 408 277 | 10/2001 |
| AT | 414 044 | 8/2006 |
| CH | 336 604 | 2/1959 |
| CH | 534 343 | 4/1973 |
| DE | 844 972 | 7/1952 |
| DE | 690 22 596 | 3/1996 |
| EP | 1 559 997 | 1/2008 |
| GB | 2 146 769 | 4/1985 |
| WO | 2005/088249 | 9/2005 |

OTHER PUBLICATIONS

Austrian Patent Office Search Report completed Aug. 18, 2010 in Austrian Patent Application No. A 1802/2009 corresponding to present U.S. application.
European Search Report received Feb. 28, 2011 in European Patent Application No. 10 01 4427.

* cited by examiner

*Primary Examiner* — G. Bradley Bennett
(74) *Attorney, Agent, or Firm* — Wenderoth, Lind & Ponack, L.L.P.

(57) ABSTRACT

A spirit level includes a profile body having a recess, a vial disposed in the recess of the profile body, and an evening-out part. A step is formed between the vial and the profile body on a side face of the profile body, and the evening-out part covers the step and spans the recess of the profile body. The evening-out part is flush with the side face of the profile body, and may have a magnifier effect.

27 Claims, 10 Drawing Sheets

SPIRIT LEVEL

BACKGROUND OF THE INVENTION (1) Field of the Invention

The invention relates to a spirit level with at least one vial disposed in a recess of a profile body of the spirit level, which vial is optionally provided with a cover, wherein there is a step between vial or cover and profile body on at least one side face of the profile body.

Furthermore, a method for the production of the spirit level according to the invention will be described.

(2) Description of Related Art

Spirit levels are already known and are disclosed, for example, in AT 414 044 B. Such and similar spirit levels are substantially comprised of an extrusion molded profile body, several different installation parts, such as holders, end caps, etc., and the vials themselves. The profile body herein has a recess into which the vial is set. This results in a step between the profile body and the vial.

It should be noted that the term "spirit level" is used colloquially and does not allow drawing conclusions regarding the filler material of the vial. Strictly speaking, a vial has at least one partially transparent container filled with at least two visually different media of different density, wherein the vial is preferably often provided with a convex shell surface and markings.

Dimensional tolerances of the profile bodies are the reason for the inability of producing flush vials using prior art. The reasons for the step resulting between vial and profile body are the entirely different installation methods currently in use, in which the vials and/or the vial holders are either set in, adhered, pressed or clamped, etc. into the profile. Due to the risk with respect to imprecisions of the spirit level and dirt and damage of the vials, these vials are fabricated or mounted such that they do not project beyond the profile body. This means that they are accommodated within the recess of the profile body. The disadvantage of this step in spirit levels that results as a consequence of prior art is that dirt etc. can collect in the recess which can lead to an impaired view of the vial.

The invention addresses the problem of specifying an improved spirit level compared to prior art.

This problem is resolved with the spirit level according to the invention thereby that an evening-out part is provided which evens out the step between vial, or between vial with cover, and profile body with respect to all bordering side faces of the profile body.

Stated differently, an evening-out part bordering flush with the side faces of the profile body results therein that a substantially continuous, even side face of the spirit level is produced in which there does not remain any recess of the profile body at this side face of the profile body in which dirt can accumulate. This flushness in a horizontal vial leads to the fact that along this side face of the spirit level continuous straight lines, such as for example marking on a wall, can be drawn, which until now was not possible due to the remaining recess of the profile body.

A further advantage of utilizing an evening-out part is that already produced prior art vials can be employed and new spirit levels do not necessarily need to be built since the evening-out part could also be subsequently placed into a recess of an already produced prior art spirit level.

Further advantageous embodiments of the invention are defined in the dependent claims and will be explained more precisely in the following.

According to a preferred embodiment example it can be provided that the evening-out part evens out the steps between vial, or vial with cover, and profile body toward two, preferably three, bordering side faces of the profile body, whereby dirt cannot be deposited on the vial. It is thereby also made possible that drawing straight and uninterrupted markings becomes possible along all bordering side faces of the profile body.

It can furthermore be preferably provided that the profile body is substantially implemented as a hollow profile. Hollow profiles as profile bodies have been found to be well suitable to be employed in spirit levels. In terms of their dimensions, they are exactly producible and especially light [of weight], specifically if, as is currently customary, an aluminum alloy is utilized as the material. It is understood, that other materials are equally suitable to be implemented as hollow profiles and to be employed in a spirit level.

It has been found to be especially advantageous if the evening-out part regionally, preferably substantially entirely, is implemented such that it is transparent to visible light, since therewith the vial is nonrestrictively visible and no restrictions result preventing reading the vial.

It is especially preferred if it can be provided that one side wall, preferably the side walls, of the evening-out part is/are at least regionally receding whereby damages of the evening-out part are avoided when the spirit level is held against a surface since a spacing between the evening-out part and the surface remains.

It has been found to be especially advantageous if the evening-out part is regionally, preferably substantially entirely, weather-resistant and/or radiation-resistant, since it is thereby ensured that, even after the spirit level has been used for many years, the values of the light transmission are high. This contributes to positive optical properties of the spirit level or of the evening-out part and to the visibility onto the vial. Especially the resistance against ultraviolet light should here be firmly emphasized as desirable.

It has been found to be advantageous if the evening-out part regionally, preferably substantially entirely, is comprised of a non-adhering and/or scratch resistant and/or reflection-free and/or self-healing surface since therewith dirt cannot collect on the surface and damages to the surface through marking pins guided along the surface cannot occur. A reflection-free surface makes possible an unobstructed view onto the vial whereby it can be read exactly. Through a self-healing surface possible scratches can automatically and self-actingly be removed again and thus ensure an unobstructed view onto the vial.

It has been found to be advantageous if the evening-out part regionally, preferably substantially entirely, is implemented of a curable casting composite, preferably substantially of epoxy resin, since a curable casting composite can be rather simply introduced into the remaining recess between the vial and the profile body.

It can preferably further be provided that the evening-out part regionally, preferably substantially entirely, is implemented of a thermoplastic synthetic material, preferably substantially of polymethylmethacrylate (plexiglass), since thermoplastics are very well formable. It is understood that every other material, which has corresponding optical and solid properties, such as for example glass, etc., is equally well suitable.

According to a feasible embodiment example it can be provided that the evening-out part is cast with the profile body, since therewith any castable materials can be employed in order to fill the remaining recess of the profile body. By the [injection] casting of the remaining recess, a gap-free transition between the evening-out part and the profile body of the spirit level is attained, which yields precisely planar and continuous interruption-free side faces of the spirit level.

According to a preferred embodiment example it can be provided that the evening-out part regionally, preferably substantially entirely, is implemented of a transparent ceramic material, preferably substantially of aluminum oxynitride, since transparent ceramic materials have excellent optical properties as well as also high hardness.

It can especially preferably be provided that the evening-out part, preferably substantially entirely, is implemented of a material with substantially identical optical properties as the material of the vial.

The evening-out part is advantageously, preferably substantially entirely, implemented of the same material as the vial since therewith no distortion of the optical properties of the spirit level occurs.

It has been found to be especially advantageous if the evening-out part comprises one, at least regionally, self-adhering layer which can be mounted and dismounted on the evening-out part, wherein the layer at least regionally, preferably substantially entirely, is implemented such that it is transparent to visible light. Through an additional self-adhering layer the desirable effect results that, should damage of the topmost layer occur, this [uppermost layer] can be replaced in simple manner and the evening-out part can be further protected. This self-adhering and scratch-resistant layer can be implemented in multiple manner with the result that these layers, depending on the degree to which they are covered with dirt or scratched, can one after the other be removed, similar to the transparent films in crash helmet visors.

According to a preferred embodiment example it can be provided that the spirit level includes a securement device, with which the evening-out part, preferably without using tools, can be mounted on the spirit level, and/or preferably without using tools, can be dismounted since through such a securement device the evening-out part can be applied subsequently to a spirit level and, should damage occur, the securement device can be replaced.

According to a feasible embodiment example it can be provided that the evening-out part has a magnifying effect whereby better reading accuracy is attained.

It has been found to be especially advantageous if the evening-out part is implemented such that the measuring face remains unobstructed since therewith the evening-out part does not affect the measuring accuracy of the spirit level.

According to a feasible embodiment example it can be provided that the profile body regionally, preferably substantially entirely, is implemented of a transparent ceramic material, preferably substantially of aluminum oxynitride, since this material has excellent optical properties and very high hardness.

It has also been found to be advantageous if the interior of the profile body, implemented as a hollow body, is implemented regionally, preferably substantially entirely, of spray foam comprised preferably substantially of polyurethane. By filling in the spirit level with foam, more precisely of the profile body, implemented as a hollow body, of the spirit level, it is attained that therewith dirt can also not penetrate into the hollow body. Upon contact with water, a spirit level thus implemented, could not become filled with water and would therewith be implemented as a floating spirit level.

The invention further relates to a method for the production of a spirit level, wherein in one method step the vial, or the vial with cover. is disposed in the profile body and in a further method step an evening-out part is introduced into the remaining space of the recess and preferably substantially fills the volume.

It has also been found to be especially advantageous if the evening-out part is implemented of a curable material and is introduced through injection casting into the remaining space of the recess and preferably substantially completely fills out the space of the recess, since through injection casting highly precise and even surface structures can be attained.

It can further preferably be provided that the evening-out part is implemented of a curable material and is introduced by casting, preferably substantially of epoxy resin, into the remaining space of the recess and preferably substantially completely fills the space of the recess, since a curable material can be introduced in simple manner by casting into the recess.

It has been found to be especially advantageous if in a further method step the profile body implemented as a hollow body, is preferably substantially completely filled with polyurethane foam. Filling with foam leads to the fact that therewith also no other materials can any longer penetrate into a profile body implemented as a hollow body and therewith it is ensured that the original manufacturing state is retained even after many years of use.

According to a feasible embodiment example it can be provided that in a further method step the surface of the evening-out part is adapted, preferably by grinding, to the bordering side face of the profile body such that through the side face of the profile body and the surface of the evening-out part a substantially planar face is realized since thereby is given a very high precision between the surface of the evening-out part and the surface of the bordering side faces of the profile body. An evening-out part which projects beyond the recess and beyond the side face of the profile body permits the excess to be adapted in a further method step and therewith an exact, continuous and planar surface be provided on the side faces of the spirit level.

In a further method step the surface of the evening-out part is advantageously adapted, preferably by being ground off, to two, preferably three, bordering side faces of the profile body such that by the side faces of the profile body and the surfaces of the evening-out part two, preferably three, substantially planar faces are realized whereby on all bordering side faces of the profile body precise planar planes with the evening-out part are formed and therewith no contaminate accumulation on the vial occurs and, furthermore, it is made possible to draw exact markings with the spirit level on a wall.

In the following, further details and advantages of the present invention will be explained in greater detail in conjunction with the description of the invention with reference to the embodiment examples shown in the drawings, in which.

Figures 1A, 1B:
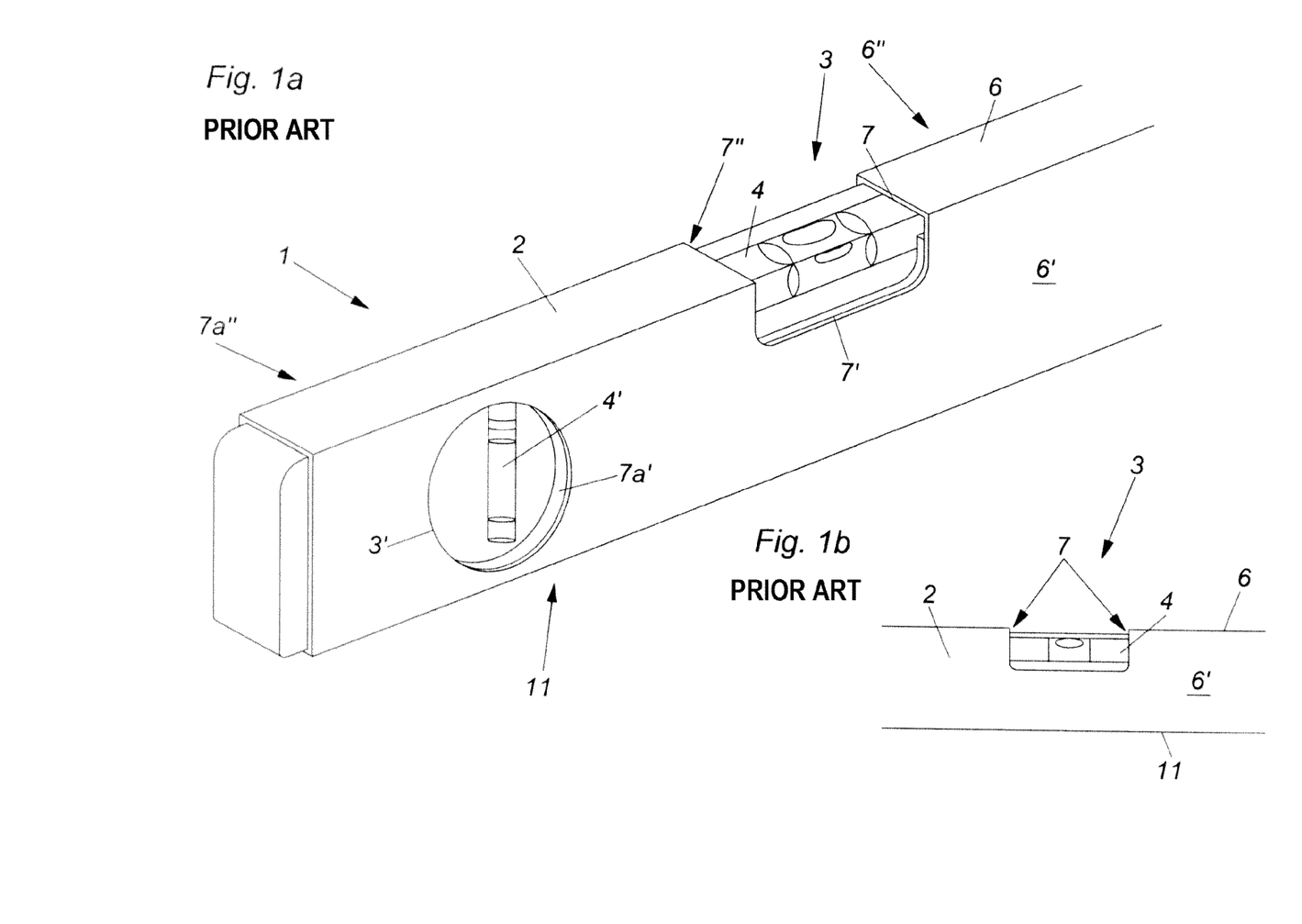
FIG. 1*a* is a perspective view of a prior art spirit level.
FIG. 1*b* is a front view of a spirit level with prior art horizontal vial.

FIG. 1a shows a perspective view of a spirit level 1 with two vials, one horizontal vial 4 and one vertical vial 4', which are disposed according to prior art in a profile body 2 here implemented, for example, as a hollow profile. The disposition of the vials 4, 4' herein takes place in the recesses 3, 3' of the profile body 2. The profile body 2 herein includes a measuring face 11 located opposite the horizontal vial 4 and parallel to the side face 6. Adjoining the horizontal vial 4 are the side faces 6, 6', 6" of the profile body 2. Adjoining the vertical vial 4' are the side faces 6' and 6" of the profile body 2. Conditional of manufacturing, through the disposition of the vials 4, 4' result in recesses 3, 3' of the profile body 2 the steps 7, 7', 7" from the horizontal vial 4 to the side faces 6, 6', 6" of profile body 2. In the vertical vial 4' result the steps 7a', 7a" to the side faces 6' and 6" of the profile body 2. Into the space between the horizontal vial 4 and the remaining portion of recess 3 of profile body 2 dirt, etc. can penetrate and therewith damage can occur to the vial 4 or impair the view thereonto. Due to the steps 7, 7' and 7" it is also not possible to mark a continuous straight line on a wall or the like along the side faces 6, 6' and 6" of profile body 2. With respect to the contamination through dirt or the view onto the vertical vial 4', the same applies to the same degree since between vial 4' and the side faces 6' and 6" steps 7a' and 7a" are located whereby therewith a space at steps 7a' and 7a" in the recess 3' of profile body 2 remains.

FIG. 1b shows a front view of a horizontal vial 4, which is disposed according to prior art in the profile body 2 of a spirit level 1. Between horizontal vial 4 and the side face 6 of the profile body 2 step 7 is clearly evident, whereby the horizontal vial 4 and the side face 6 are not flush with one another. Consequently, along the side face 6 of profile body 2 a straight marking on a wall or similar cannot be drawn. It is also possible for dirt to collect on the horizontal vial 4 as well as also in the remaining recess 3 of the profile body 2 and consequently impair the view onto the horizontal vial 4.

Figures 1C, 1D:
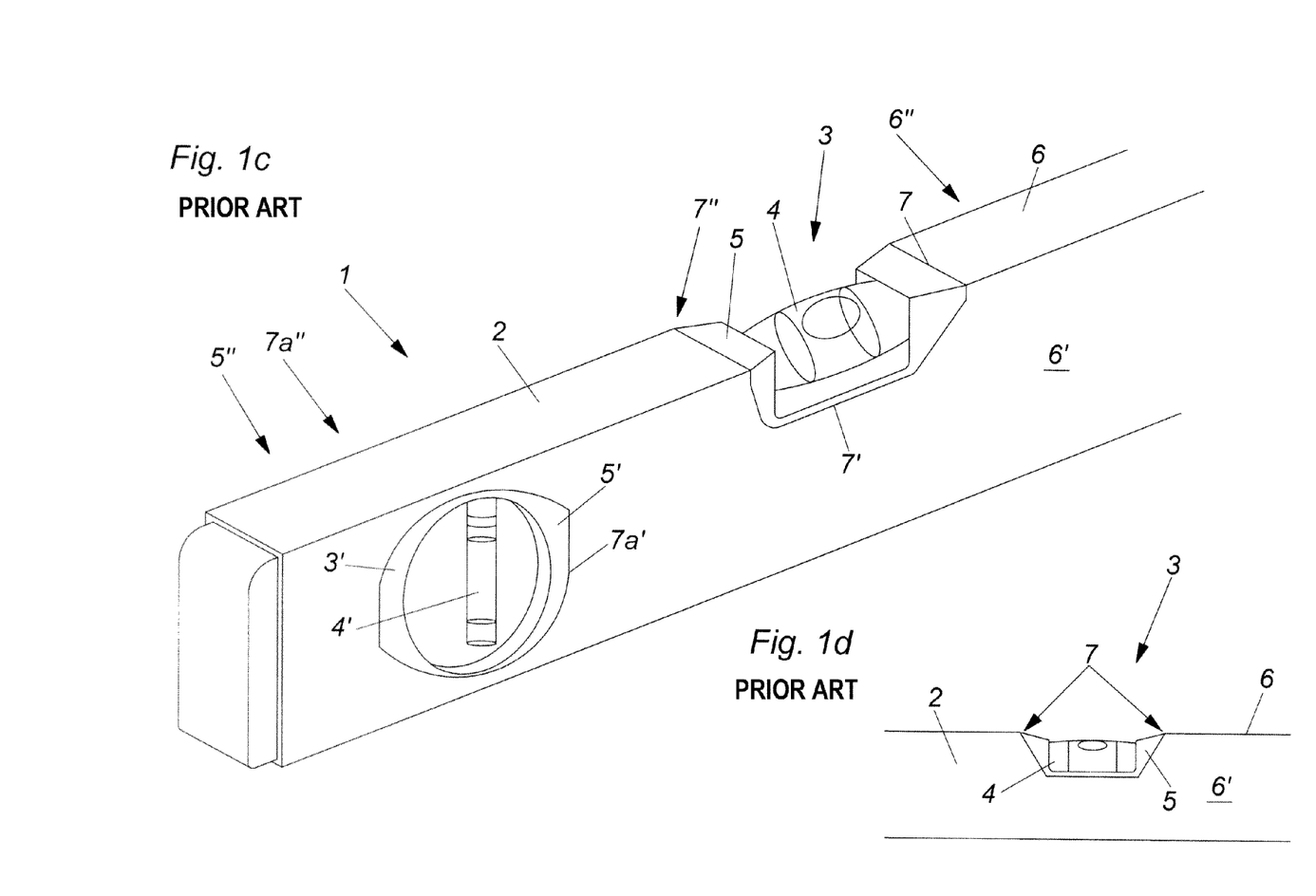
FIG. 1*c* is a perspective view of a prior art spirit level.
FIG. 1*d* is a front view of a prior art spirit level with horizontal vial with cover.

FIG. 1c shows a perspective representation of a spirit level according to prior art. Herein in recesses 3, 3' of profile body 2 vials 4, 4' with cover 5, 5', 5" are disposed. As is the case in the horizontal vial 4, steps 7, 7', 7" result between cover 5 and side faces 6, 6', 6" of the profile body 2. In the case of the vertical vial 4' also result steps 7a' and 7a" between the covers 5', 5" and the side faces 6' and 6" of the profile body.

FIG. 1d shows a horizontal vial 4 with cover 5 in a profile body 2 of a spirit level 1 according to prior art. As depicted in FIG. 1b, here also results a step 7 to the side face 6 of the profile body 2. Not depicted are herein steps 7' and 7" which, of course, result to the side faces 6' and 6" of the profile body 2.

Figure 2A:
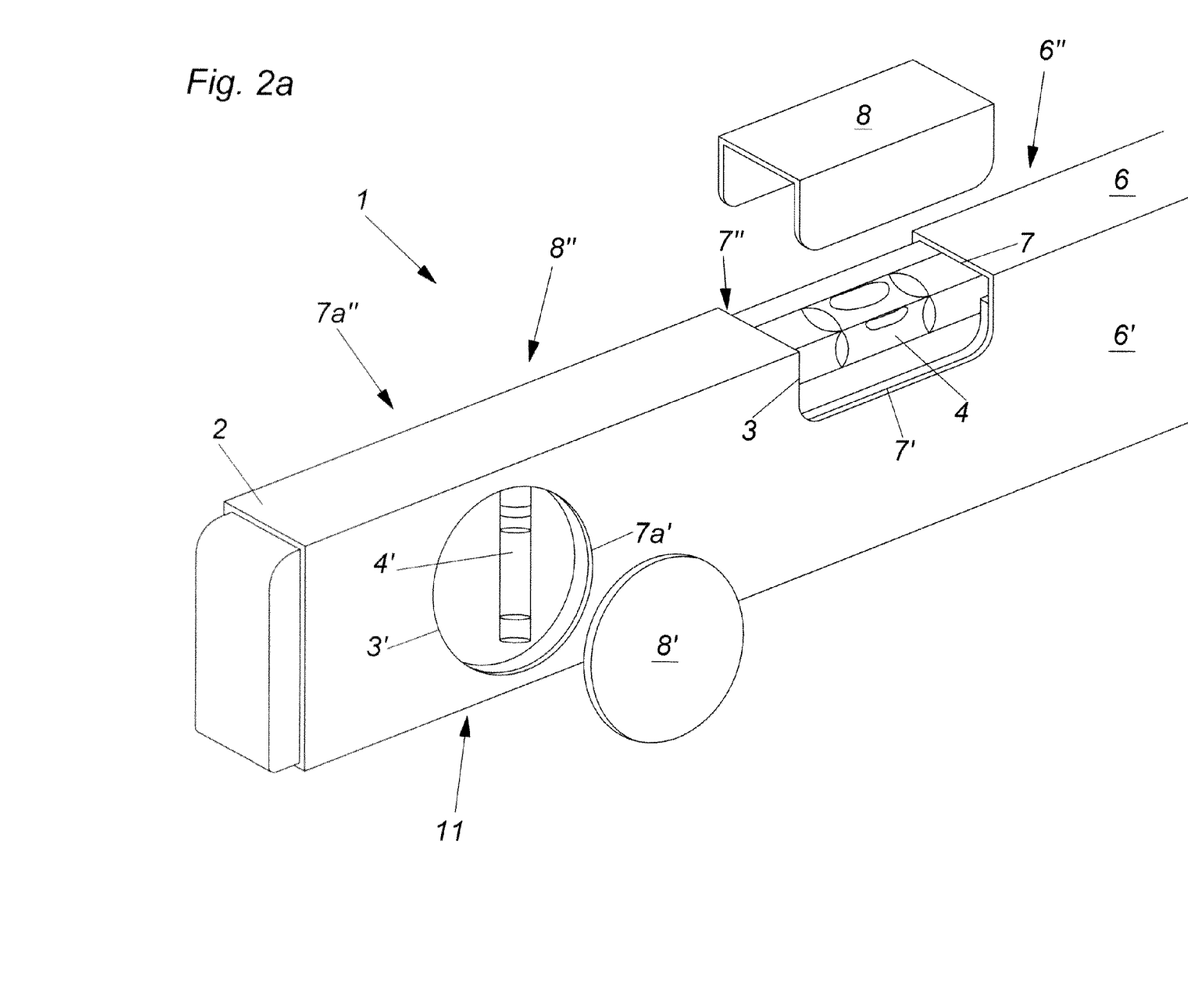
FIG. 2*a* is a perspective exploded representation of a spirit level with evening-out parts.

FIG. 2a shows a profile body 2 with vials 4, 4', which are disposed in the recesses 3, 3' of the profile body 2. Steps 7, 7', 7" which result in the case of the horizontal vial 4 to the side faces 6, 6', 6" of the profile body 2, are evened out using the evening-out part 8, whereby the evening-out part 8 adjoins flush all bordering side faces 6, 6', 6" of profile body 2. Consequently, along the side face 6, 6', 6" of profile body 2 dirt cannot collect on the horizontal vial 4. Along the side faces 6, 6', 6" of profile body 2 also a straight line can be marked on a wall or the like. In the case of the vertical vial 4' step 7a' to the side face 6' of profile body 2 is evened out by means of the evening-out part 8', on the side face 6" the step 7a" (not shown) is similarly evened out with the evening-out part 8" (not shown). Consequently, the evening-out parts 8' and 8" are flush with all bordering side faces 6' and 6" of profile body 2. Therewith, on both sides of the vertical vial no dirt can accumulate on the vial and, like the horizontal vial 4, it is also protected against damage. It is understood, that these evening-out parts 8, 8', 8" are preferably implemented to be transparent to visible light, whereby an unrestricted view onto the vials 4, 4' is made possible. It is also understood and conceivable that these evening-out parts 8, 8', 8" are intended to fulfill a pure protective function for the vials 4, 4' and are implemented as nontranslucent covers, whereby the vials 4, 4' are protected during a transport or during their storage. In this embodiment example the evening-out parts 8, 8', 8" are translucent, weather-resistant and resistant against ultraviolet light, they also include a non-adhering, scratch-resistant or self-healing and reflection-free surface, whereby high reading accuracy is attained and they cannot be easily damaged. It is also feasible to draw continuous straight markings on walls if a pencil or the like is guided along an edge of the spirit level 1. The material of the evening-out part 8, 8', 8" in this case is plexiglass. It is understood that any other synthetic material or also glass or the like, that has hard, scratch-resistant and translucent properties, is also conceivable. For the evening-out part 8, 8', 8", of course, also the same material as for the vial 4, 4' can be utilized, or a material with the same or similar optical properties as the material of the vials 4, 4'. In this embodiment example the evening-out parts 8, 8', 8" do not include a magnifier effect, but it would, of course, also be conceivable that the evening-out parts 8, 8', 8" have a magnifier effect.

The profile body 2 implemented in this embodiment example as a hollow body advantageously can be filled out with foam with the result that in the interior of the spirit level dirt or other materials can also not collect.

Figures 2B, 2C:
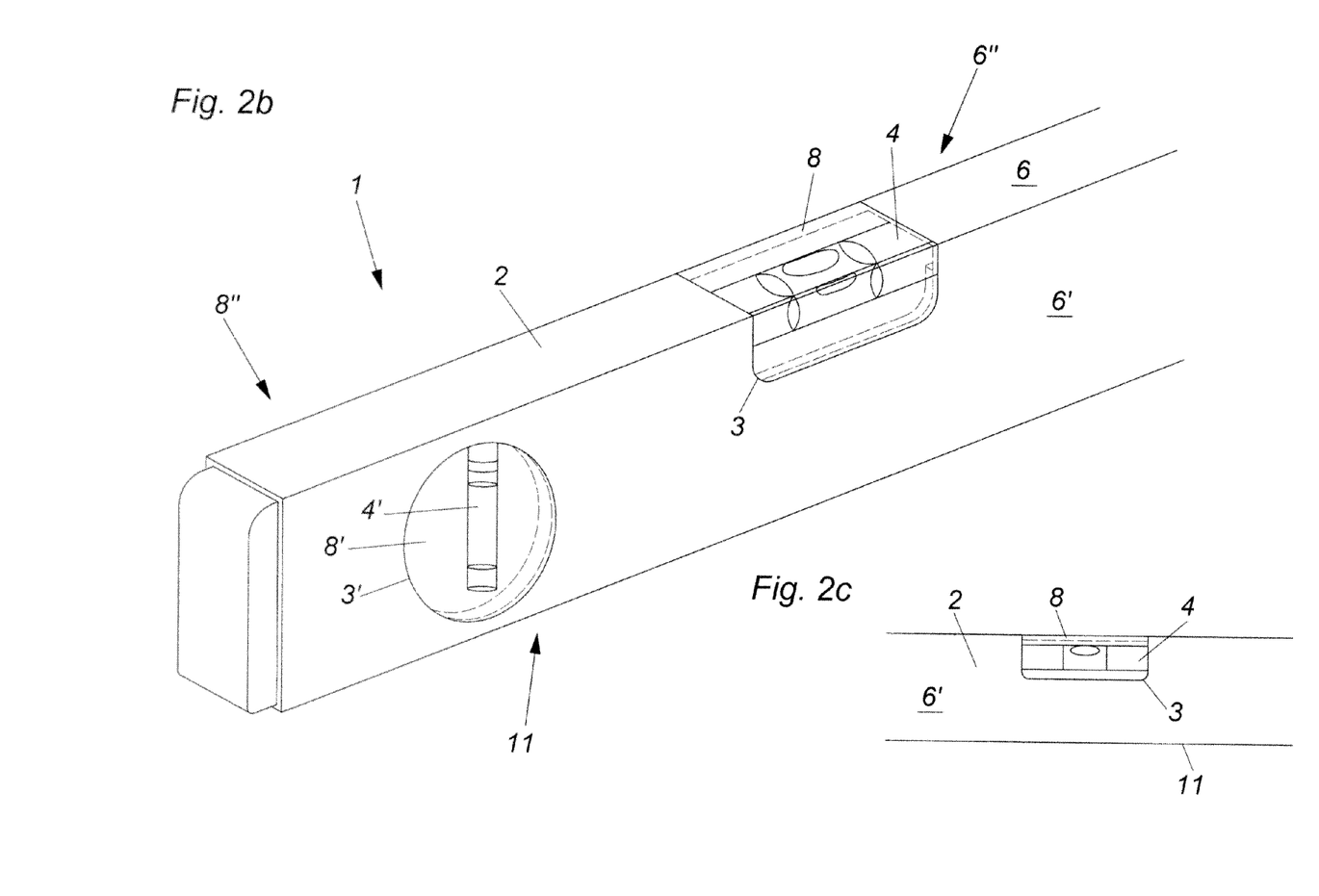
FIG. 2*b* is a perspective view of a spirit level with evening-out parts.
FIG. 2*c* is a front view of a horizontal vial with evening-out part.

FIG. 2b and FIG. 2c show the evening-out parts 8, 8', 8" placed into the recesses 3, 3' of profile body 2, whereby flush transitions from evening-out part 8, 8', 8" to all bordering side faces 6, 6', 6" of profile body 2 are provided. There are therewith no longer any steps 7, 7', 7" 7a', 7a" (not shown). In FIG. 2a was shown that a solid evening-out part 8, 8', 8" had been placed into the profile body 2, in FIGS. 2b and 2c evening-out parts 8, 8', 8" are shown which could have been introduced by casting into the recess 3, 3' of profile body 2. The casting could, of course, also take place by means of an injecting casting method. Of importance herein is only that after the casting process or the casting of the composite of the evening-out part 8, 8', 8" and the curing of these evening-out parts 8, 8', 8" flushness with all bordering side faces 6, 6', 6" of the profile body is completed and the measuring face 11 of the spirit level 1 remains unobstructed in order not to affect the measuring accuracy of the spirit level 1. Therewith a spirit level 1 is obtained which has on all vials 4, 4' flush transitions to all bordering side faces 6, 6', 6" through the evening-out parts 8, 8', 8".

Figures 2D, 2E:
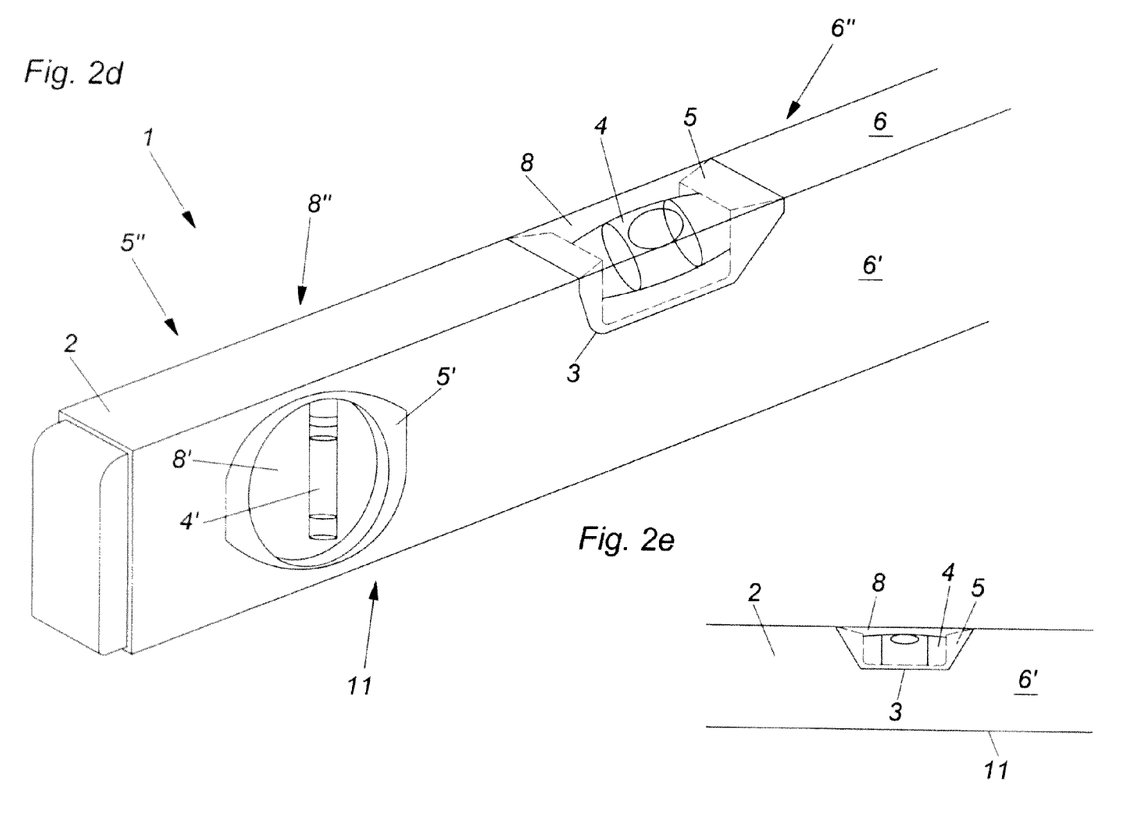
FIG. 2*d* is a perspective view of a spirit level with evening-out part.
FIG. 2e is a front view of a horizontal vial with cover and evening-out part.

FIGS. 2d and 2e also show the evening-out parts 8, 8', 8" emplaced in a spirit level 1 as was just shown in FIGS. 2b and 2c, with the sole difference that vials 4 and 4' are herein provided with covers 5, 5', 5".

Figure 2F:
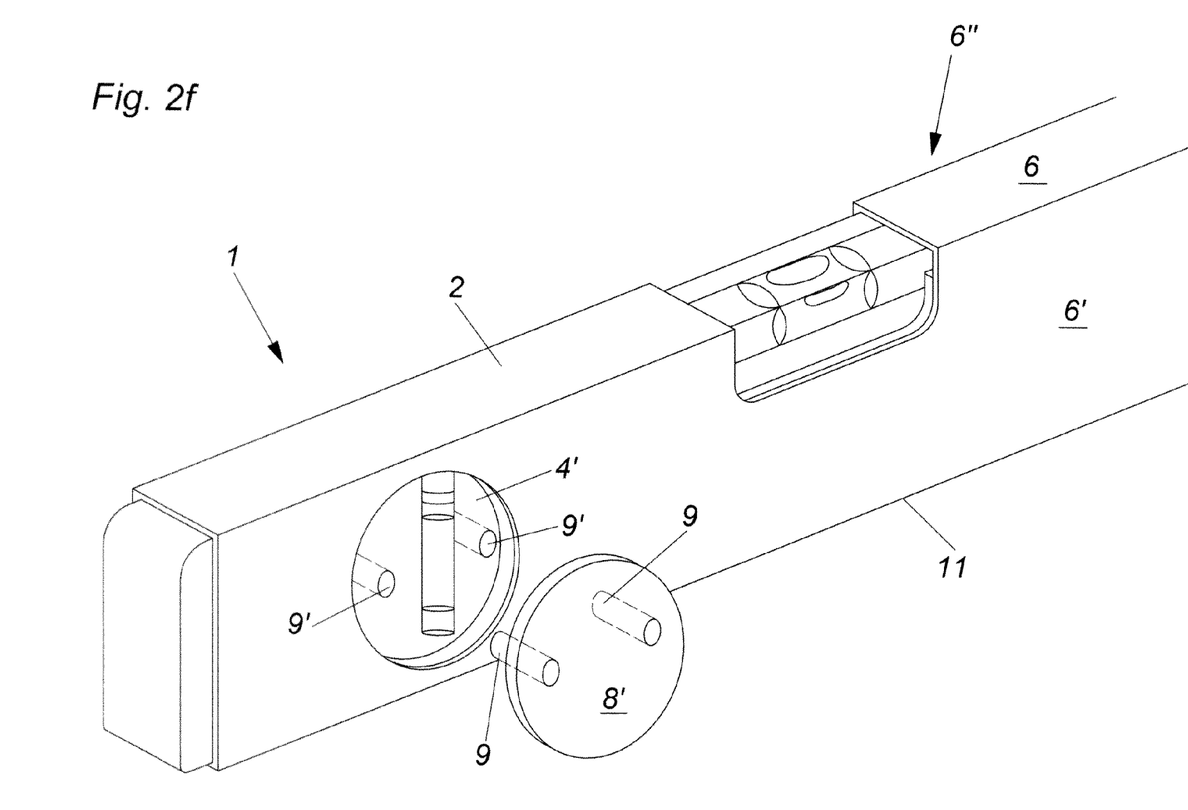
FIG. 2f is a perspective view of a spirit level with evening-out part and securement device.

FIG. 2f shows a spirit level 1, in which the vertical vial 4' and the evening-out part 8' include a securement device 9, 9', with which the evening-out part 8' can be secured on the spirit level or the vertical vial 4'. It is therewith made possible that the evening-out part 8' can be secured accurately as to position and, in the event of damage, potentially also replaceably, on the spirit level 1. It is understood that it would also be conceivable for the securement device 9, 9' not to be implemented on the evening-out part 8' or the vertical vial 4'. It could also be implemented on the profile body 2. It is also entirely conceivable for the securement device to be provided on the horizontal vial 4 or on the profile body 2 or the evening-out part 8 (not shown). Thus, it could, for example, be made possible by simply clipping on the evening-out part 8, 8', 8" (not shown) to implement the evening-out parts 8, 8', 8" such that they can be replaced by mounting and dismounting.

Figures 3A, 3B:
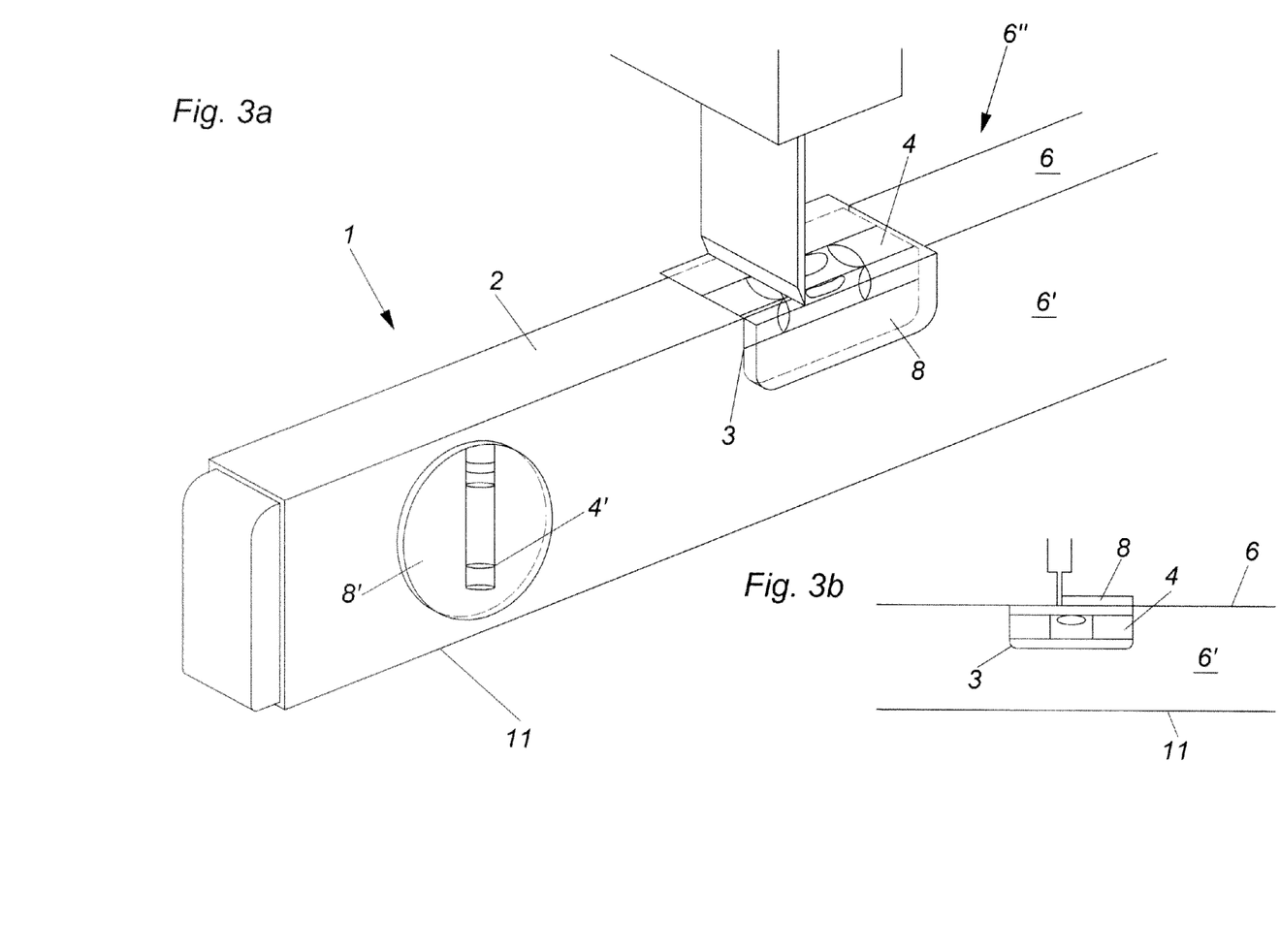
FIG. 3a is a perspective view of a spirit level with projecting evening-out parts.
FIG. 3b is a front view of a projecting evening-out part.

FIGS. 3a and 3b depict the manner in which the evening-out parts 8, 8' project above the recesses 3. 3' and the manner in which subsequently these parts projecting above the side faces 6, 6', 6" of the profile body 2 can be mechanically removed and thus exact, planar transitions from the side faces 6, 6', 6" of profile body 2 to the evening-out parts 8, 8' are produced.

Figure 3C:
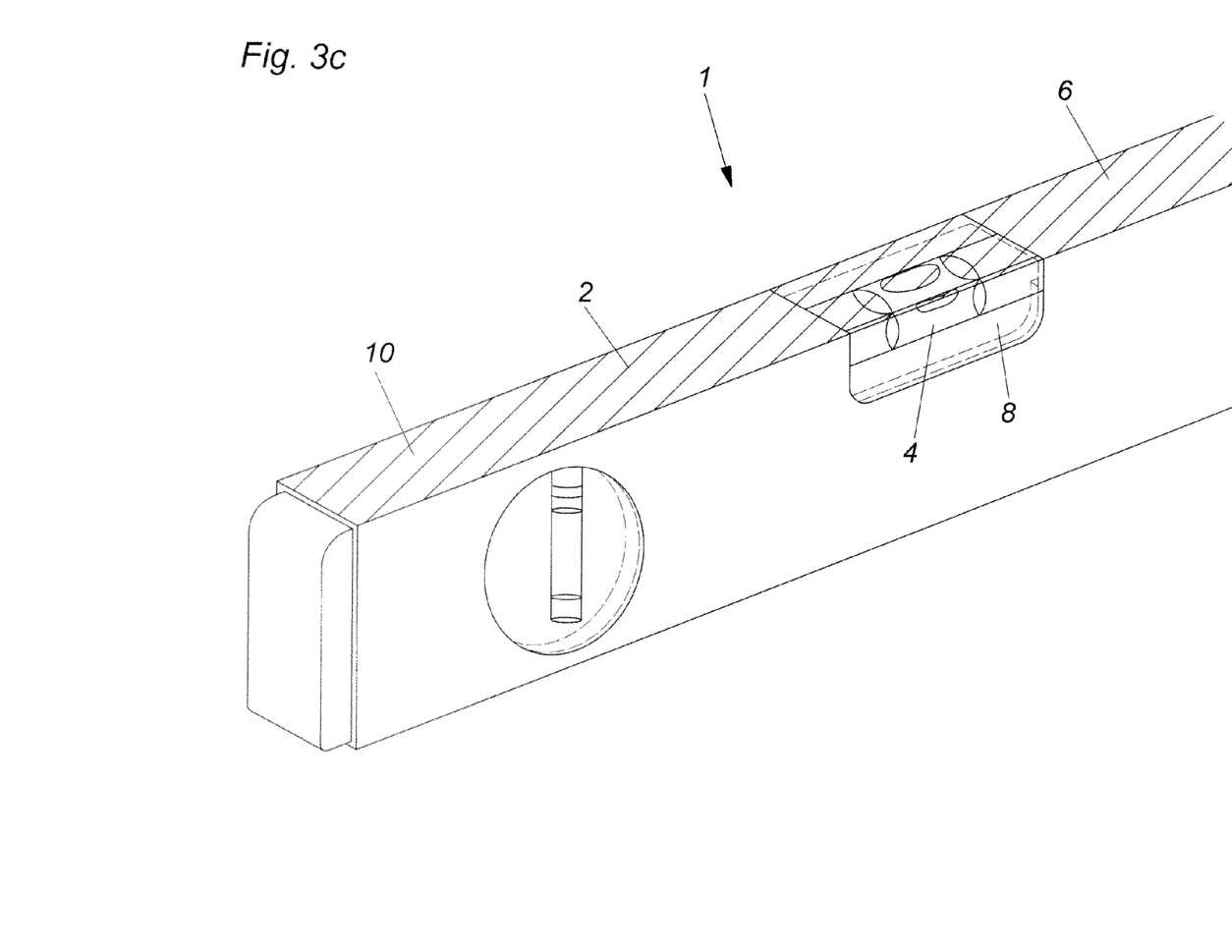
FIG. 3c is a perspective view of a spirit level with additional layer.

FIG. 3c shows a spirit level 1 which on the side face 6 and the evening-out part 8 includes a layer 10 which is translucent to visible light and which can be disposed on the side face 6 and the flush evening-out part 8. It would, of course, also be conceivable for this layer 10 to be disposed only on the evening-out part 8. This layer 10 serves for the protection of the evening-out part 8. Thereby that this layer 10 is implemented as a thin film, also a straight marking along the side face 6 of profile body 2 can be drawn, even if the layer 10 is only applied on the evening-out part 8. It is also conceivable for several of these layers 10 to be applied one above the other, whereby after damage or contamination, one of these layers 10 can be removed by peeling it off and consequently full visibility onto the vial 4 is again restored. It would, of course, also be conceivable for the layer 10 to include a tab which is readily detachable or detached from the spirit level 1 in order to ensure the easy peeling off of layer 10 from evening-out part 8 or the side face 6. Such a layer 10 would also be conceivable and desirable in the case of the vertical vial 4' in order to protect the evening-out part 8', 8" (not shown).

Figures 4A, 4B:
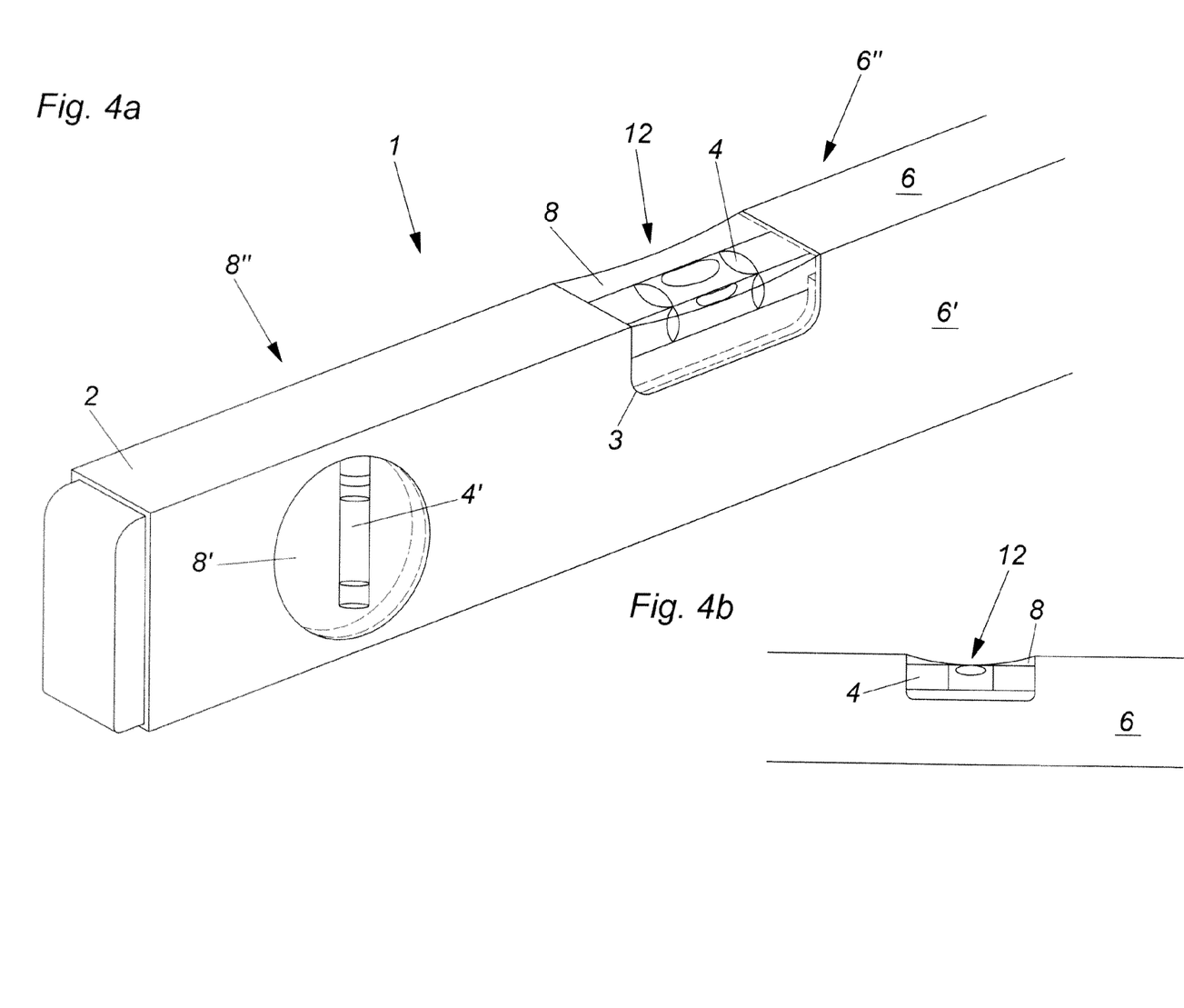
FIG. 4a is a perspective view of a spirit level with flush, receding evening-out part.
FIG. 4b is a front view of a spirit level with flush, receding evening-out part in the horizontal vial.

FIGS. 4a and 4b show a spirit level 1 with evening-out parts 8, 8', 8" bordering flush on the side faces 6, 6', 6" of the profile body 2. The evening-out part 8 of the horizontal vial 4 herein is minimally receding, preferably in the range of 1 to 3 tenths millimeter. Such a receding region is, of course, provided on all three side faces of evening-out part 8 of the vial 4, as well as also on the two evening-out parts 8', 8" of vial 4'. Such is however not depicted in this embodiment example. The effect attained through this receding region 12 is that no damage to the evening-out parts 8, 8', 8" occurs if the spirit level 1 is held against a wall and is displaced on this wall, since through the receding region 12 the spirit level 1 is exclusively with the profile body 2 in contact on the wall and not with the evening-out parts 8, 8', 8".

Figure 5:
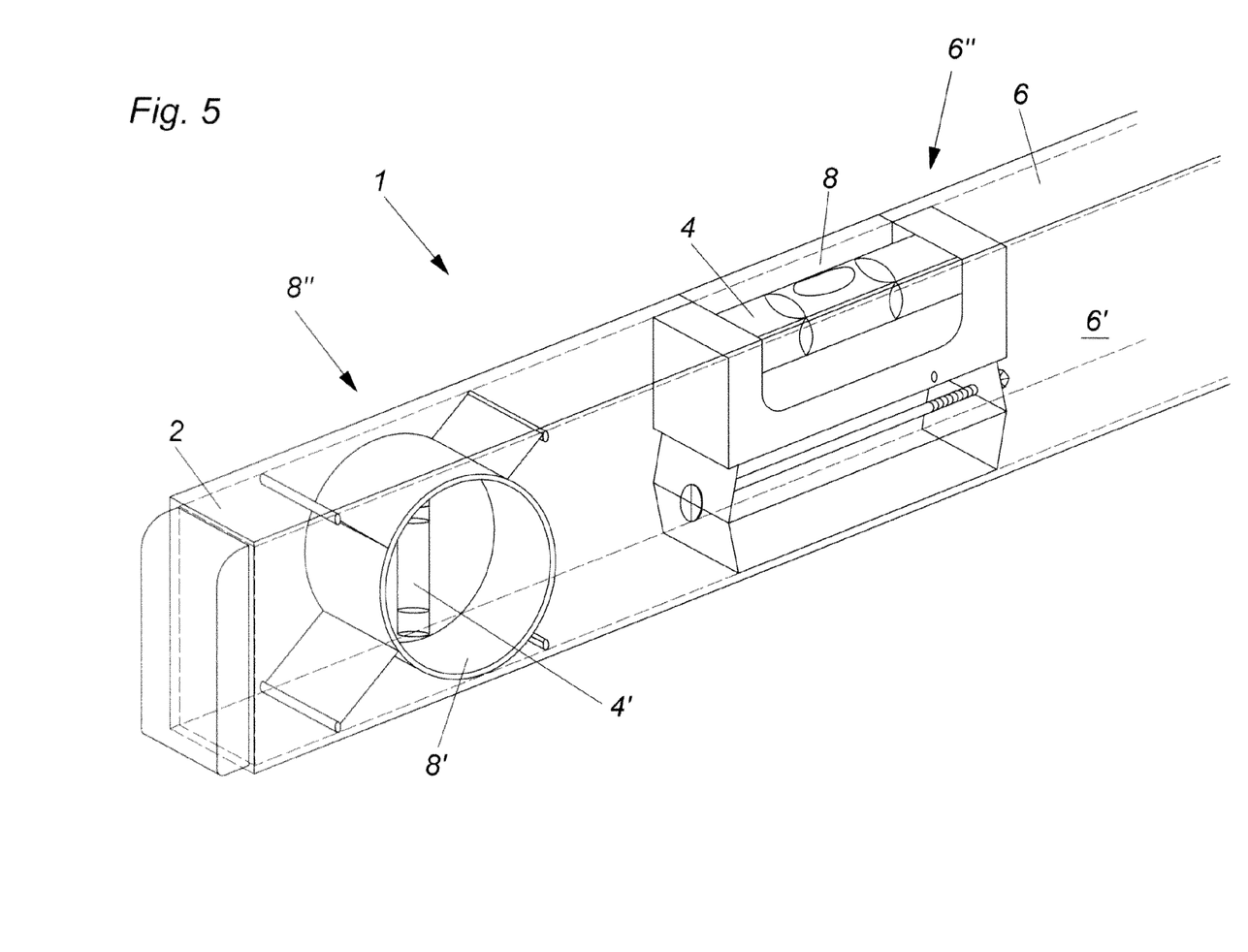
FIG. 5 is a perspective view of a translucent spirit level.

FIG. 5 shows a nearly completely translucent spirit level 1, wherein the profile body 2 is produced of translucent aluminum. Here also even faces are attained along the side faces 6, 6', 6" of the spirit level 1 since the evening-out parts 8, 8', 8" are also produced of translucent aluminum and adjoin flush.

It is understood that the depicted embodiment examples of spirit levels, as well as the described example of the feasible production method, are not to be understood in a restrictive sense but rather only as several examples of numerous feasibilities for realizing the inventive concept of a spirit level.

While in these embodiment examples in every case profile bodies 2 were utilized which were implemented as hollow bodies, it would, however, also be conceivable to implement the profile body as a solid profile or any other profile.

LIST OF REFERENCE NUMBERS

1 Spirit level
2 Profile body
3, 3' Recess of the profile body
4, 4' Vial
5, 5', 5" Cover of the vial
6, 6', 6" Side face of the profile body
7, 7', 7", 7a', 7a" Step
8, 8', 8" Evening-out part
9, 9' Securement device
10 Layer
11 Measuring face
12 Receding region

The invention claimed is:

1. A spirit level comprising:
a profile body having a recess;
a vial disposed in the recess of the profile body; and
an evening-out part;
wherein a first step is formed between the vial and the profile body at a first side face of the profile body,
wherein the evening-out part covers the first step and spans the recess of the profile body,
wherein the evening-out part is flush with the first side face of the profile body, and
wherein the profile body is substantially implemented as a hollow profile.

2. The spirit level of claim 1, wherein a second step is formed between the vial and the profile body at a second side face of the profile body, and
wherein a first surface of the evening-out part is flush with the first side face of the profile body and a second surface of the evening-out part is flush with the second side face of the profile body.

3. The spirit level of claim 1, wherein the evening-out part is substantially transparent to visible light.

4. The spirit level of claim 1, wherein one side wall of the evening-out part is at least regionally recessed.

5. The spirit level of claim 1, wherein the evening-out part is weather-resistant and/or radiation resistant.

6. The spirit level of claim 1, wherein the evening-out part has a non-adhering and/or scratch-resistant and/or reflection-free and/or self-healing surface.

7. The spirit level of claim 1, wherein the evening-out part is made of a curable casting composite.

8. The spirit level of claim 1, wherein the evening-out part is made of a thermoplastic synthetic material.

9. The spirit level of claim 1, wherein the evening-out part is cast together with the profile body.

10. The spirit level of claim 1, wherein the evening-out part is made of a transparent ceramic material.

11. The spirit level of claim 1, wherein the evening-out part is made of a material with properties substantially identical to the properties of the material of the vial.

12. The spirit level of claim 1, wherein the evening-out part is made of the same material as the vial.

13. The spirit level of claim 1, wherein the evening-out part includes at least one at least regionally self-adhering layer, which is mountable and dismountable on the evening-out part,
wherein the layer is transparent to visible light.

14. The spirit level of claim 1, wherein the spirit level includes a securement device with which the evening-out part can be mounted on the spirit level and dismounted from the spirit level.

15. The spirit level of claim 1, wherein the evening-out part has a magnifier effect.

16. The spirit level of claim 1, wherein the vial or the evening-out part is implemented such that the measuring face remains free.

17. The spirit level of claim 1, wherein the profile body is made of a transparent ceramic material.

18. The spirit level of claim 1, wherein the interior of the profile body includes spray foam.

19. The spirit level of claim 1, further comprising a cover which covers a portion of the vial, the cover being disposed at the first step formed between the vial and the profile body and being covered by the evening-out part.

20. A method of producing a spirit level, the spirit level comprising:
  a profile body having a recess;
  a vial disposed in the recess of the profile body; and
  an evening-out part;
  wherein a first step is formed between the vial and the profile body at a first side face of the profile body,
  wherein the evening-out part covers the first step and spans the recess of the profile body, and
  wherein the evening-out part is flush with the first side face of the profile body;
  wherein the method comprises:
  placing the vile into the profile body; and
  after said placing operation, introducing the evening-out part into the remaining space of the recess such that the evening-out part substantially entirely fills the space.

21. The method of claim 20, wherein the evening-out part is made of a curable material and is introduced through injection casting into the remaining space of the recess and fills out the space of the recess.

22. The method of 21, wherein the curable material is epoxy resin.

23. The method of 20, wherein the profile body is hollow, and the method includes filling the profile body with polyurethane foam.

24. The method of claim 20, further comprising:
  forming a planar face by grinding the evening-out part to be flush with the first side face of the profile body.

25. The method of claim 20, further comprising:
  forming a planar face by grinding the evening-out part to be flush with two side faces of the profile body.

26. The spirit level of claim 1, wherein the evening-out part is flush with all bordering side faces of the profile body.

27. The spirit level of claim 1, wherein the recess is constituted by a hollow portion formed in the profile body and entirely circumscribed by the first side face of the profile body.

* * * * *